(12) United States Patent
Patel et al.

(10) Patent No.: US 8,066,188 B2
(45) Date of Patent: *Nov. 29, 2011

(54) POINT-OF-TRANSACTION WORKSTATION FOR ELECTRO-OPTICALLY READING ONE-DIMENSIONAL AND TWO-DIMENSIONAL INDICIA BY IMAGE CAPTURE

(75) Inventors: Mehul M. Patel, Fort Salonga, NY (US); Duanfeng He, South Setauket, NY (US); Howard Shepard, Great River, NY (US); Eugene Joseph, Coram, NY (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/788,980

(22) Filed: May 27, 2010

(65) Prior Publication Data

US 2010/0237150 A1     Sep. 23, 2010

Related U.S. Application Data

(63) Continuation of application No. 10/901,515, filed on Jul. 29, 2004, now Pat. No. 7,748,631.

(51) Int. Cl.
*G06K 7/10* (2006.01)
*G06K 9/80* (2006.01)
*G06K 9/36* (2006.01)
*G06K 19/06* (2006.01)

(52) U.S. Cl. ........... 235/462.14; 235/462.1; 235/462.11; 235/462.04

(58) Field of Classification Search .................. 235/454, 235/462.1, 462.01, 472.01, 462.14
See application file for complete search history.

(56) References Cited

U.S. PATENT DOCUMENTS

| | | | |
|---|---|---|---|
| 3,225,177 A | 12/1965 | Stites, at al. | |
| 3,417,231 A | 12/1968 | Stites, at al. | |
| 3,679,828 A | 7/1972 | Becky | |
| 4,644,143 A * | 2/1987 | McJohnson et al. | 235/462.42 |
| 4,743,773 A * | 5/1988 | Katana et al. | 235/462.07 |
| 5,151,581 A * | 9/1992 | Krichever et al. | 235/454 |
| 5,314,631 A | 5/1994 | Katoh et al. | |
| 5,315,097 A | 5/1994 | Collins et al. | |
| 5,406,060 A * | 4/1995 | Gitin | 235/462.42 |
| 5,717,195 A | 2/1998 | Feng et al. | |
| 5,801,370 A | 9/1998 | Katoh et al. | |
| 5,804,805 A | 9/1998 | Koenck et al. | |
| 5,936,218 A * | 8/1999 | Ohkawa et al. | 235/462.01 |
| 5,952,642 A | 9/1999 | Lutz | |
| 5,988,506 A | 11/1999 | Schaham et al. | |
| 5,992,747 A | 11/1999 | Katoh et al. | |
| 6,053,413 A | 4/2000 | Swift et al. | |

(Continued)

FOREIGN PATENT DOCUMENTS

EP         1246118         1/2002

(Continued)

*Primary Examiner* — Thien Mai
(74) *Attorney, Agent, or Firm* — Nong-Qiang Fan

(57) ABSTRACT

A solid-state imager is mounted at a point-of-transaction workstation for capturing images of one- and two-dimensional indicia and is operated at high speed to resist image blurring due to relative movement between the target and the imager. Dedicated hardware assistance and computation resources are allocated to decode multiple, continuous and simultaneous video streams from multiple imagers at the workstation.

14 Claims, 6 Drawing Sheets

U.S. PATENT DOCUMENTS

| | | |
|---|---|---|
| 6,065,678 A | 5/2000 | Li et al. |
| 6,066,857 A | 5/2000 | Fantone et al. |
| 6,216,950 B1 | 4/2001 | Ohkawa et al. |
| 6,616,044 B1 | 9/2003 | Gu |
| 6,832,729 B1 * | 12/2004 | Perry et al. ............... 235/472.01 |
| 6,974,083 B1 | 12/2005 | Kahn et al. |
| 2001/0042789 A1 * | 11/2001 | Krichever et al. ....... 235/462.14 |
| 2003/0010824 A1 | 1/2003 | McQueen |
| 2003/0085284 A1 | 5/2003 | Bremer et al. |
| 2003/0183693 A1 | 10/2003 | Okamoto |
| 2004/0195327 A1 * | 10/2004 | Reiffel .......................... 235/454 |
| 2007/0187506 A1 * | 8/2007 | Reiffel .......................... 235/454 |

FOREIGN PATENT DOCUMENTS

| | | |
|---|---|---|
| WO | 2004003830 | 1/2004 |
| WO | 2006023114 | 3/2006 |

* cited by examiner

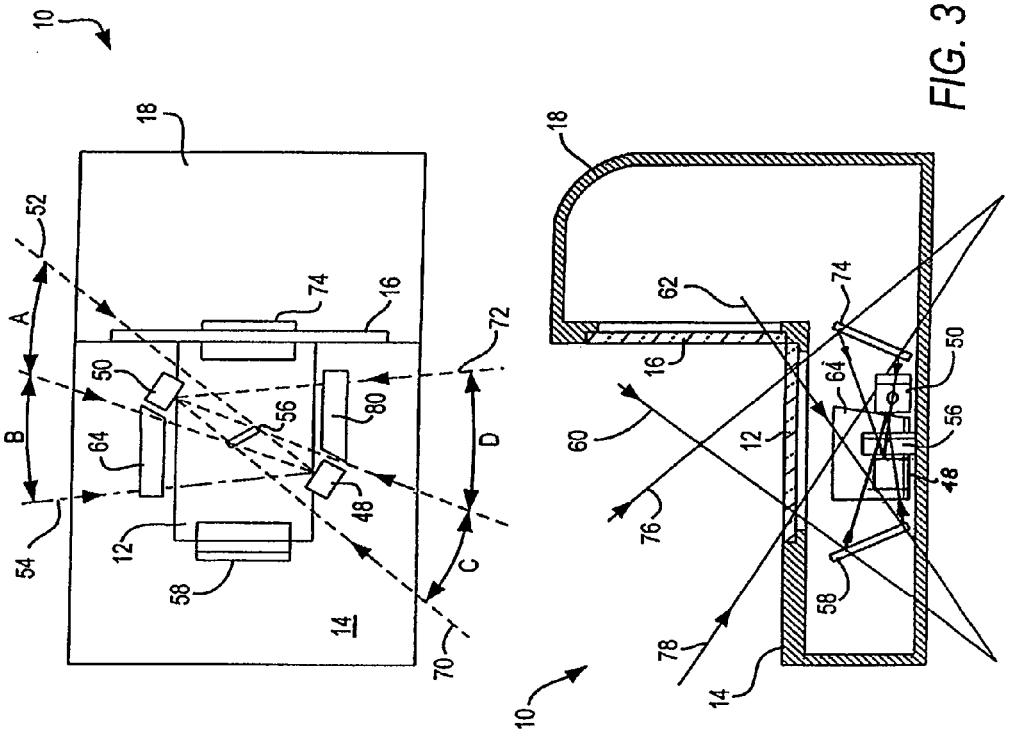
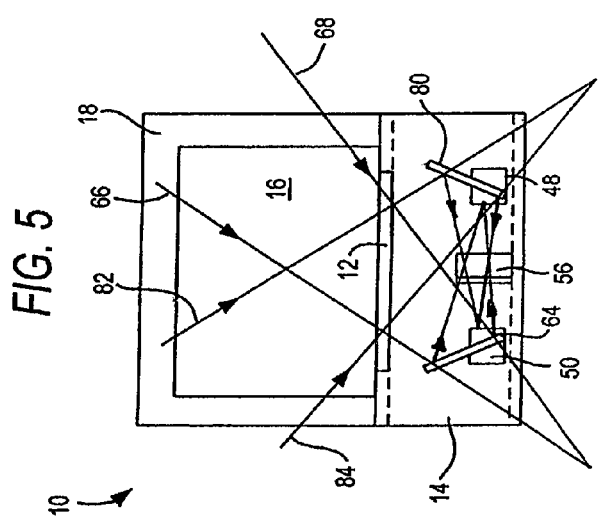

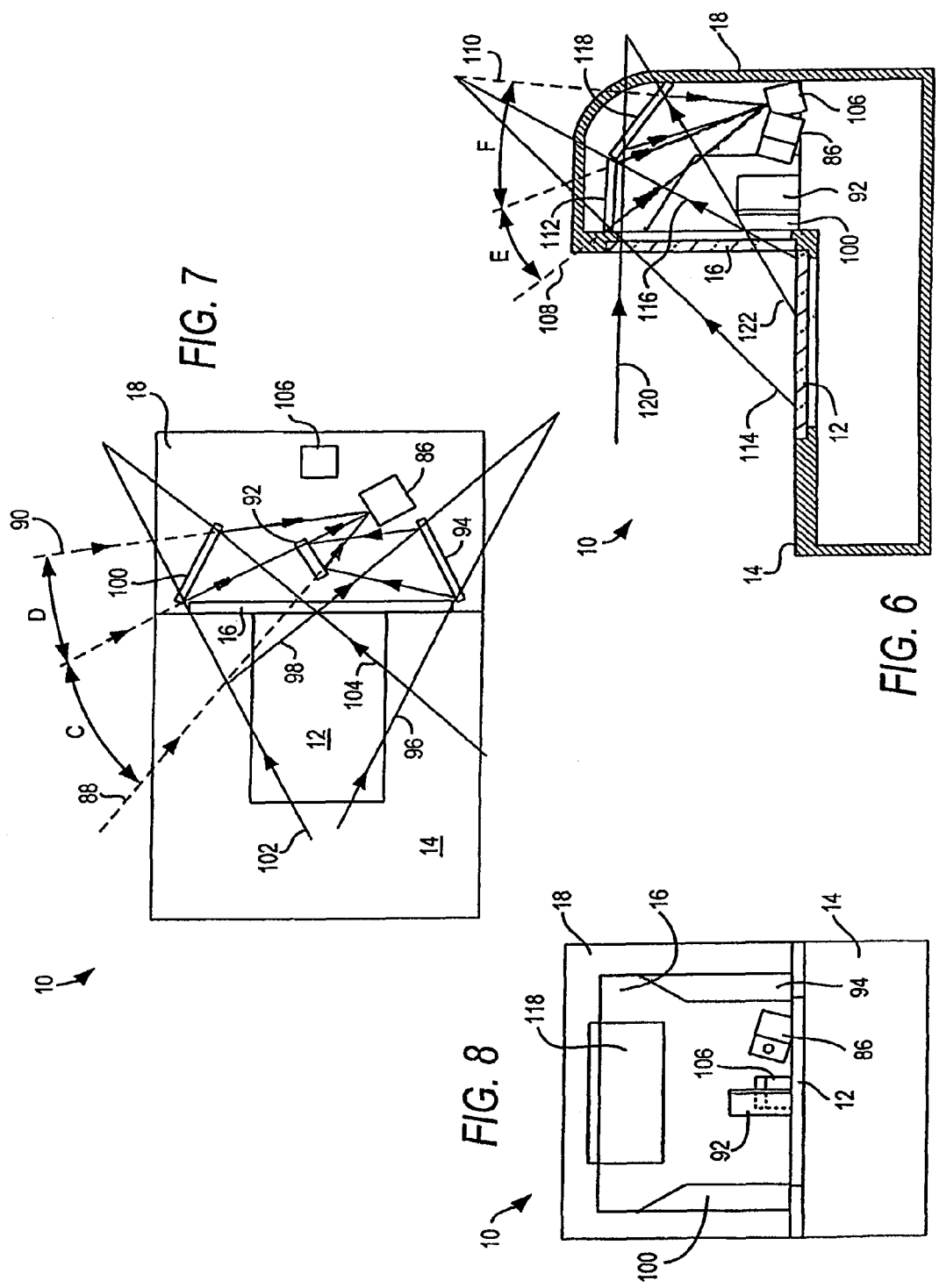

POINT-OF-TRANSACTION WORKSTATION FOR ELECTRO-OPTICALLY READING ONE-DIMENSIONAL AND TWO-DIMENSIONAL INDICIA BY IMAGE CAPTURE

RELATED APPLICATIONS

This application is a Continuation Application of U.S. patent application Ser. No. 10/901,515, field Jul. 29, 2004, which is issued as U.S. Pat. No. 7,748,631.

BACKGROUND OF THE INVENTION

1. Field of the Invention

The present invention generally relates to an electro-optical reader for reading indicia and, more particularly, to a point-of-transaction workstation for reading not only one-dimensional indicia, such as bar code symbols, but also for reading two-dimensional indicia, by image capture.

2. Description of the Related Art

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. No. 5,059,779; No. 5,124,539 and No. 5,200,599, a single, horizontal window is set flush with, and built into, a horizontal countertop of the workstation. Products to be purchased bear an identifying symbol and are typically slid across the horizontal window through which a multitude of scan lines is projected in a generally upwards direction. When at least one of the scan lines sweeps over a symbol associated with a product, the symbol is processed and read.

The multitude of scan lines is generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the horizontal window as a scan pattern of the scan lines.

It is also known to provide a point-of-transaction workstation with a generally vertical window that faces an operator at the workstation. The generally vertical window is oriented perpendicularly to the horizontal window, or is slightly rearwardly inclined. The scan pattern generator within the workstation also projects the multitude of scan lines in a generally outward direction through the vertical window toward the operator. The generator for the vertical window can be the same as or different from the generator for the horizontal window. The operator slides the products past either window from right to left, or from left to right, in a "swipe" mode. Alternatively, the operator merely presents the symbol on the product to the center of either window in a "presentation" mode. The choice depends on operator preference or on the layout of the workstation.

Sometimes, the vertical window is not built into the workstation as a permanent installation. Instead, a vertical slot scanner is configured as a portable reader which is placed on the countertop of an existing horizontal slot scanner.

Each product must be oriented by the operator with the symbol facing away from the operator and directly towards either window. Hence, the operator cannot see exactly where the symbol is during scanning. In typical "blind-aiming" usage, it is not uncommon for the operator to repeatedly swipe or present a single symbol several times before the symbol is successfully read, thereby slowing down transaction processing and reducing productivity.

The blind-aiming of the symbol is made more difficult because the position and orientation of the symbol are variable. The symbol may be located low or high, or right to left, on the product, or anywhere in between. The symbol may be oriented in a "picket fence" orientation in which the elongated parallel bars of the one-dimensional UPC symbol are vertical, or in a "ladder" orientation in which the symbol bars are horizontal, or at any orientation angle in between.

In such an environment, it is important that the scan lines located at, and projected from, either window provide a full coverage scan zone which extends down as close as possible to the countertop, and as high as possible above the countertop, and as wide as possible across the width of the countertop. The scan patterns projected into space in front of the windows grow rapidly in order to cover areas on products that are positioned not on the windows, but several inches therefrom. The scan zone must include scan lines oriented to read symbols positioned in any possible way across the entire volume of the scan zone.

As advantageous as these point-of-transaction workstations are in processing transactions involving products associated with one-dimensional symbols each having a row of bars and spaces spaced apart along one direction, the workstations cannot process two-dimensional symbols, such as Code 49 which introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786. Such two-dimensional symbols are generally read by electro-optical readers operative for projecting a laser beam as a raster of scan lines, each line extending in one direction over a respective row, and all the lines being spaced apart along a height of the two-dimensional symbol in a generally perpendicular direction. Also, the turning mirrored component of the scan pattern generators in the known workstations tend to wear out because of its constant motion and need to be replaced from time to time.

The aforementioned Code 49 and PDF417, however, both belong to a special class of two-dimensional symbols, which are especially designed to be able to be scanned by rastering laser scanners. The more general class of two-dimensional symbols, such as DataMatrix, are not designed in a way conducive for laser scanning.

Both one- and two-dimensional symbols can be read by employing solid-state imagers, including those two-dimensional symbols that cannot be read by laser scan pattern generators. For example, an image sensor device may be employed which has a one- or two-dimensional array of cells or photosensors which correspond to image elements or pixels in a field of view of the device. Such an image sensor device may include a one- or two-dimensional charge coupled device (CCD) or a complementary metal oxide semiconductor (CMOS) device and associated circuits for producing electronic signals corresponding to a one- or two-dimensional array of pixel information for a field of view.

It is therefore known to use a solid-state device for capturing a monochrome image of a symbol as, for example, disclosed in U.S. Pat. No. 5,703,349. It is also known to use a solid-state device with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

However, the known point-of-transaction workstations do not read two-dimensional symbols, nor do they utilize solid-state imagers for capturing images of one-dimensional symbols or two-dimensional symbols required to be electro-optically read. To acquire a target image, a solid-state imager, for example as embodied in a consumer digital camera, must be held in a stationary position relative to the target. Only when a solid-state imager is held in a fixed position relative to a target symbol can an image of the symbol be clearly captured and decoded, with the data encoded in the symbol being sent to a host for processing. In the context of a point-of-transaction workstation where the operator swipes the symbol past the window, sometimes once, sometimes several times, and where the operator presents the symbol with an additional component of movement toward and away from a window, and in some cases where the symbols are transported on a moving conveyor past a window, the image of the symbol is blurred due to the relative motion between the symbol and the imager and, as a result, the image cannot be reliably and successfully decoded and read. Also, the field of view of a single solid-state imager is not extensive, thereby compromising the capability of providing a full coverage, light collection zone at the countertop.

SUMMARY OF THE INVENTION

Objects of the Invention

Accordingly, it is an object of this invention is to advance the state of the art of point-of-transaction workstations to electro-optically read both one- and two-dimensional symbols.

Another object of this invention is to reliably capture one- and two-dimensional target images at point-of-transaction workstations without image blur.

Still another object of this invention is to generate an extensive, full coverage, light collection zone at such workstations.

FEATURES OF THE INVENTION

In keeping with these objects and others which will become apparent hereinafter, one feature of this invention resides, briefly stated, in an arrangement for processing transactions, comprising a stationary point-of-transaction workstation having a window at which a target associated with a transaction is presented. By way of example, the target may be a one-dimensional indicium such as a UPC symbol associated with an object passing through the workstation, or the target may be a two-dimensional symbol such as a PDF417 symbol also associated with an object. In the preferred application, the object is a product to be purchased by a consumer, and the workstation is installed in a retail establishment, such as a supermarket.

In accordance with this invention, a one- or two-dimensional, solid-state imager is mounted at the workstation, and is operative for capturing light along different viewing directions from different, plural light collection regions at which the target is presented. The imager is of the CCD or CMOS type. The imager is fixedly mounted at the workstation and may be mounted behind the window. When the workstation has an upright window and a horizontal window, the imager can be located behind either window, and captures the light from the target through either or both windows. More than one imager, and different imager types, may be utilized in a single workstation.

The field of view of the imager may be split by stationary field mirrors into a plurality of the light collection regions. Alternatively, the field of view of the imager may be alternately directed to the light collection regions by a moving mirror.

The imager is associated with a high-speed illuminator to enable the image of the target to be acquired in a very short period of time, for example, on the order of 500 microseconds or less, so that the target image is not blurred even if there is relative motion between the imager and the target.

The imagers must be coordinated to operate in an out-of-phase fashion so that only one imager is taking a picture at any time. This is to avoid the illuminator of one imager from blinding another imager.

Each imager is allocated dedicated hardware assistance and computation resources so that the overall system can satisfy the computation bandwidth required to decode multiple continuous and simultaneous video streams.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 3-5 are front, top and side, part-sectional views of a workstation similar to FIG. 1 in accordance with another embodiment of this invention;

FIGS. 6-8 are front, top and side, part-sectional views of the workstation of FIGS. 3-5 in accordance with still another embodiment of this invention;

FIG. 9b is a variant of the diagram of FIG. 9a;

FIG. 9c is another variant of the diagram of FIG. 9a; and

DETAILED DESCRIPTION OF THE PREFERRED EMBODIMENTS

Figure 1:
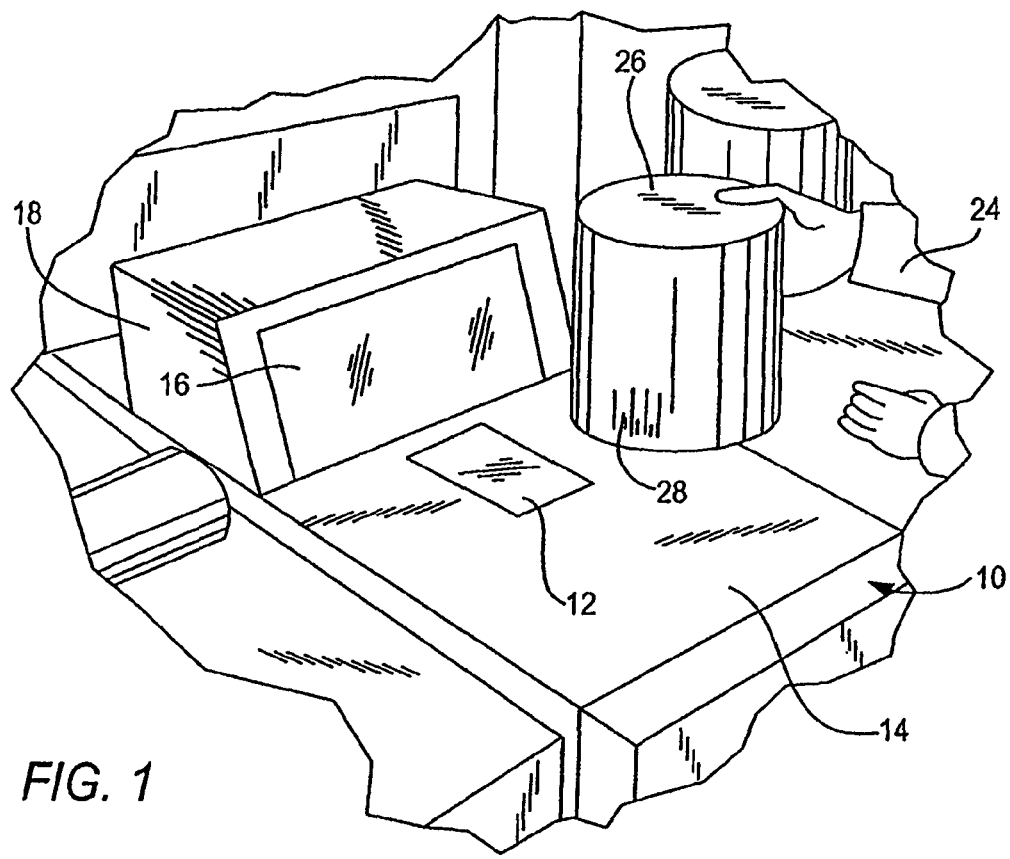
FIG. 1 is a perspective view of a dual window point-of-transaction workstation operative for reading one-dimensional indicia and two-dimensional indicia in accordance with this invention.

FIG. 1 depicts a dual window, point-of-transaction workstation 10 used by retailers to process transactions involving the purchase of products bearing an identifying symbol, typically the one-dimensional UPC symbol or the two-dimensional PDF 417 symbol described above. Workstation 10 has a horizontal window 12 set flush into a countertop 14, and a vertical or generally vertical (referred to as "vertical" or "upright" hereinafter) window 16 set flush into a raised housing 18 above the countertop.

Figure 2:
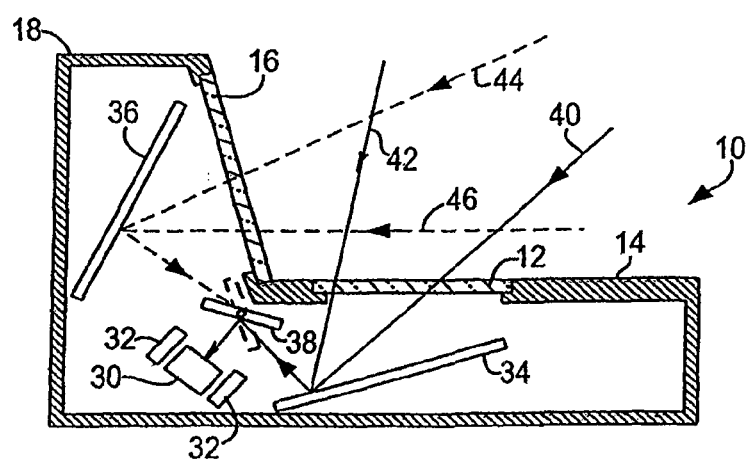
FIG. 2 is a part-sectional, part-diagrammatic view of the workstation of FIG. 1 in accordance with one embodiment of this invention.

In accordance with this invention, as shown in FIG. 2, an imager 30 including an illuminator 32 are mounted at the workstation, for capturing light along different viewing directions from different plural light collection regions at which a target symbol is presented. The imager 30 is a solid-state linear or area array, preferably a CCD or CMOS array. The imager 30 can be fixedly mounted exteriorly of the workstation on the housing 18, or on the countertop 14, but preferably is mounted behind at least one of the windows. One or more imagers, and different types of imagers, can be employed. The illuminator 32 is preferably a plurality of light sources, e.g., light emitting diodes (LEDs), arranged in an annulus around the imager 30, or in other diverse and beneficial locations on the workstation, to uniformly and effectively illuminate the target, as further described below.

Two stationary field mirrors 34, 36 are arranged adjacent windows 12, 16, respectively. A pivoting mirror 38 is turnable between a solid-line position in which light rays 40, 42 bounding a first light collection region impinge on the field mirror 34 and are directed to mirror 38 for reflection therefrom to the imager 30, and a dashed-line position in which light rays 44, 46 bounding a second light collection region impinge on the field mirror 36 and are directed to mirror 38 for reflection therefrom to the imager 30.

In use, an operator 24, such as a person working at a supermarket checkout counter, processes a product 26 bearing a target symbol 28 thereon, past the windows 12, 16 by swiping the product across a respective window in the abovementioned swipe mode, or by presenting the product at the respective window in the abovementioned presentation mode. If the symbol 28 is located on the bottom of the product, then light from the illuminator scattered by the symbol in the first collection region passes through the horizontal window 12. If the symbol 28 is located on the side of the product, then light from the illuminator scattered by the symbol in the second collection region passes through the upright window 16. The plural light collection regions oriented along different viewing directions provide an extensive, full coverage zone in which the symbol is imaged and read.

In the embodiment of FIG. 2, the field of view of the imager is alternately directed through the windows 12, 16, but not at the same time. Hence, the embodiments of FIGS. 3-5 and of FIGS. 6-8 are preferred since, as described below, the field of view of each imager is split to form plural light collection regions which are simultaneously formed to capture light. The illuminators for the imagers in the embodiments of FIGS. 3-5 and FIGS. 6-8 have been omitted for clarity, but they are to be positioned diversely on the workstation, generally in places closer to the workstation surface than the imager itself, and emitting along the directions of each of the split field-of-views, such that the light they emit can be more efficiently directed towards the target.

As best seen in FIG. 4, a pair of imagers 48, 50 is located underneath the horizontal window 12. Imager 48 has a field of view bounded by light rays 52, 54. A first part A of the field of view is intercepted by a central mirror 56 operative for capturing light incident on stationary side mirror 58 which, in turn, captures light in a light collection region bounded by rays 60, 62. A second part B of the field of view bypasses the central mirror 56 and captures light from a stationary side mirror 64 which, in turn, captures light in another light collection region bounded by rays 66, 68.

Analogously, imager 50 has a field of view bounded by light rays 70, 72. A first part C of the field of view is intercepted by the central mirror 56 operative for capturing light incident on stationary side mirror 74 which, in turn, captures light in a light collection region bounded by rays 76, 78. A second part D of the field of view bypasses the central mirror 56 and captures light from a stationary side mirror 80 which, in turn, captures light in another light collection region bounded by rays 82, 84.

Thus, the embodiment of FIGS. 3-5 depicts the use of two imagers, each having its field of view split into a pair of light collection regions oriented along different viewing directions, and is suitable for use as a horizontal slot scanner since the upright window 16 is not used.

The embodiment of FIGS. 6-8 also depicts the use of two imagers, each having its field of view split into a pair of light collection regions oriented along different viewing directions, and is suitable for use as a vertical slot scanner since the horizontal window 12 is not used. Of course, if the embodiment of FIGS. 3-5 were combined with the embodiment of FIGS. 6-8, then both windows are employed to constitute a dual window workstation.

As best seen in FIG. 7, imager 86 has a field of view bounded by rays 88, 90. A first part C of the field of view is intercepted by central mirror 92 operative for capturing light incident on side mirror 94 which, in turn, captures light in a light collection region bounded by rays 96, 98. A second part D of the field of view bypasses the central mirror 92 and captures light from a side mirror 100 which, in turn, captures light in another light collection region bounded by rays 102, 104.

As best seen in FIG. 8, another imager 106 has a field of view bounded by rays 108, 110. A first part E of the field of view captures light from top mirror 112 and, in turn, captures light in a light collection region bounded by rays 114, 116. A second part F of the field of view captures light from top mirror 118 and, in turn, captures light in another light collection region bounded by rays 120, 122.

Figure 9A:
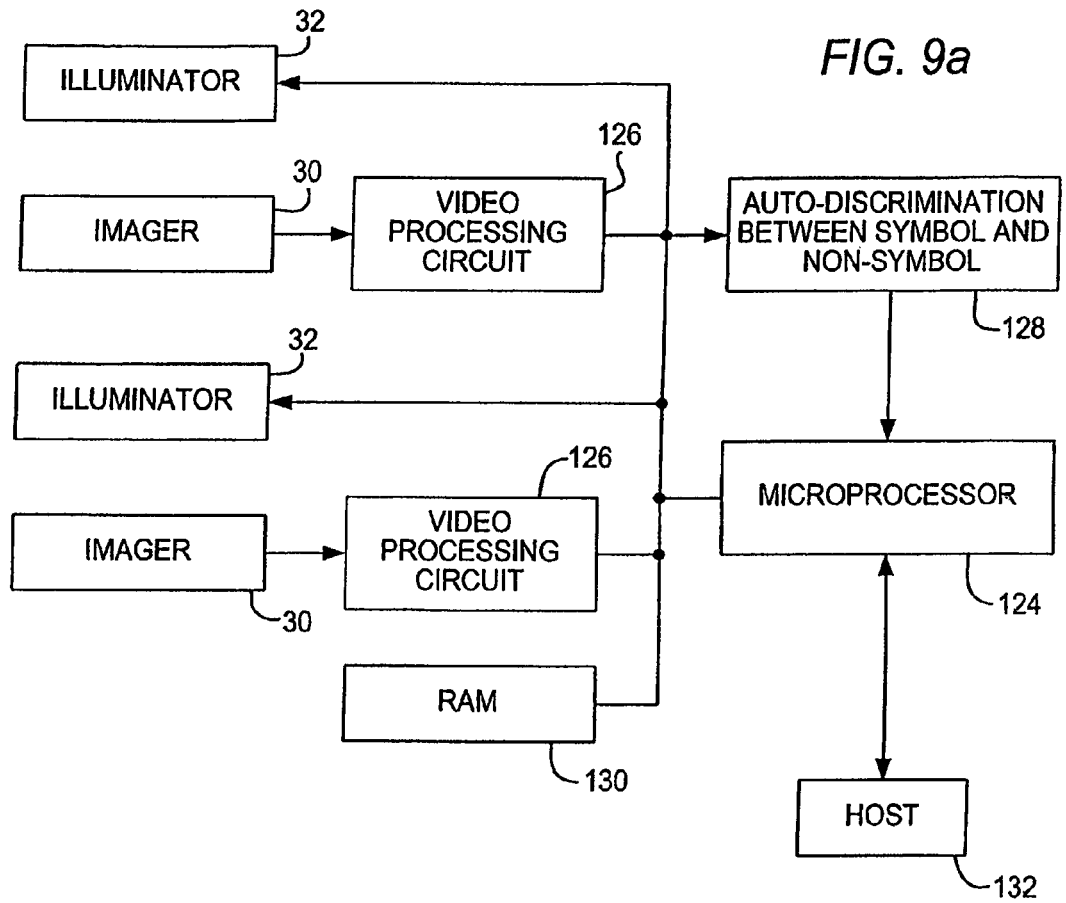
FIG. 9a is a block circuit diagram of various components of the workstation of FIG. 1.

As shown in FIG. 9a, a plurality of imagers 30 and their illuminators 32 are operatively connected to a microprocessor 124 operative for controlling the operation of these components. Preferably, the microprocessor is the same as the one used for processing the captured target images.

In operation, the microprocessor 124 sends a command signal to each illuminator 32 to pulse the LEDs for a short time period of 500 microseconds or less, and energizes each imager 30 to collect light from a target only during said time period. By acquiring a target image during this brief time period, the image of the target is not blurred even in the presence of relative motion between the imager and the target.

Each imager operates in a continuous image acquisition mode. The continuous video stream generated during the continuous image acquisition mode can, however, overload a conventional video processing circuit and, as a result, cause some frames of the target image to be dropped. In further accordance with this invention, a high-speed video processing circuit 126 receives each continuous video stream and, with the aid of an auto-discrimination circuit 128, determines and selects which portions of images in the stream are one-dimensional symbols, which portions of images are two-dimensional symbols, and which portions of images are not symbols at all. The microprocessor 124, after such selections made by the auto-discrimination circuit 128, concentrates its efforts mainly on portions of images containing the symbols for decoding. This dramatically reduces the computational burden on the microprocessor 124. The non-symbol portions of the images are still transferred to a memory, such as RAM 130, because the auto-discrimination circuit 128 may not have delineated the symbol and non-symbol portions of the images precisely, or the microprocessor may need areas surrounding the symbol portions for additional information, such as the variation in illumination level. The method used for autodiscrimination between one- and two-dimensional symbols is described in U.S. Pat. No. 6,250,551, the entire contents of which are incorporated herein by reference thereto.

Alternatively, other auto-discrimination algorithms may be employed. The auto-discrimination circuit may preferably be implemented in a dedicated circuit component outside of the microprocessor, such as an FPGA (field-programmable gate array) or ASIC (application specific integrated circuit).

Figure 9B:
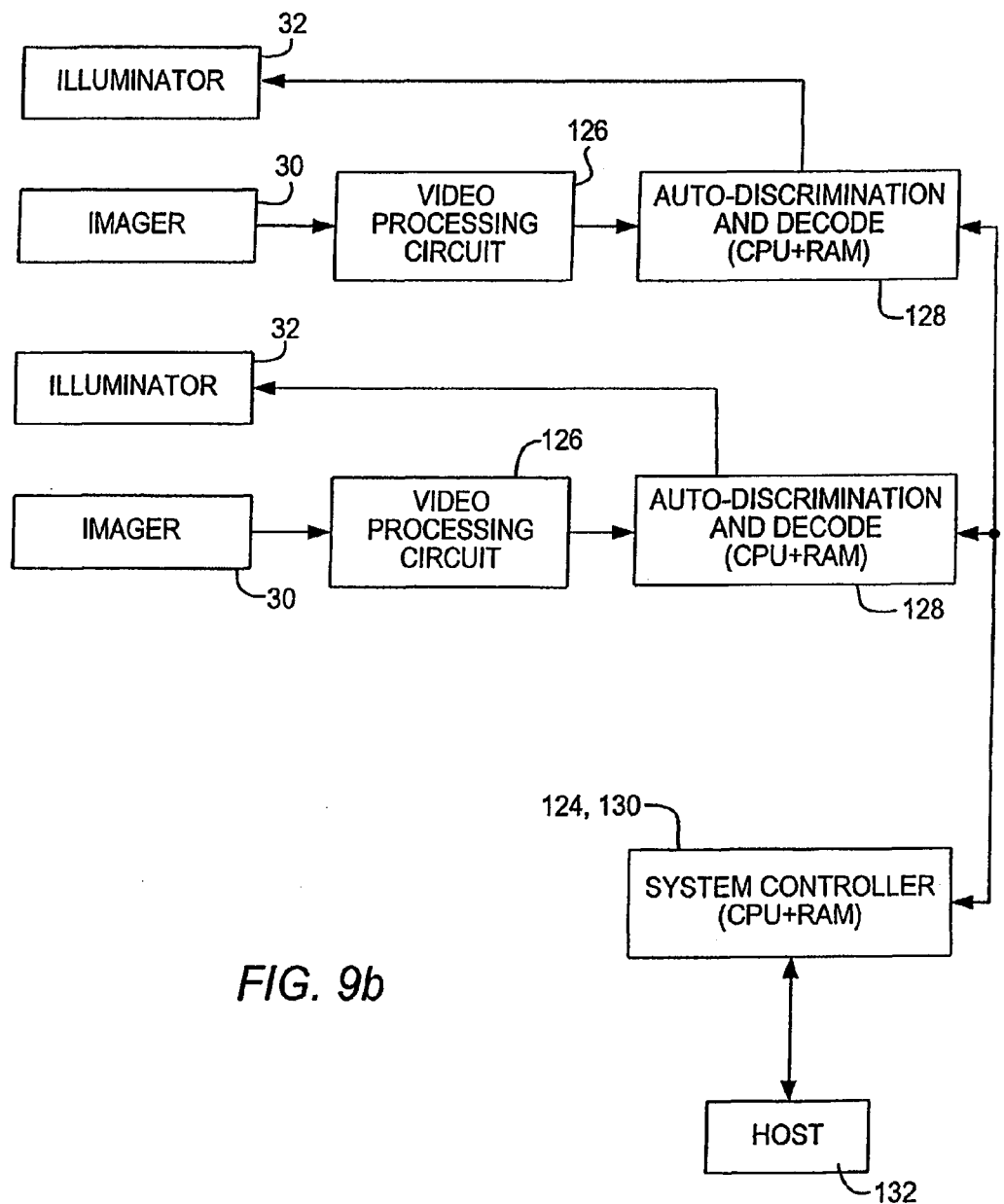
Figure 9C:
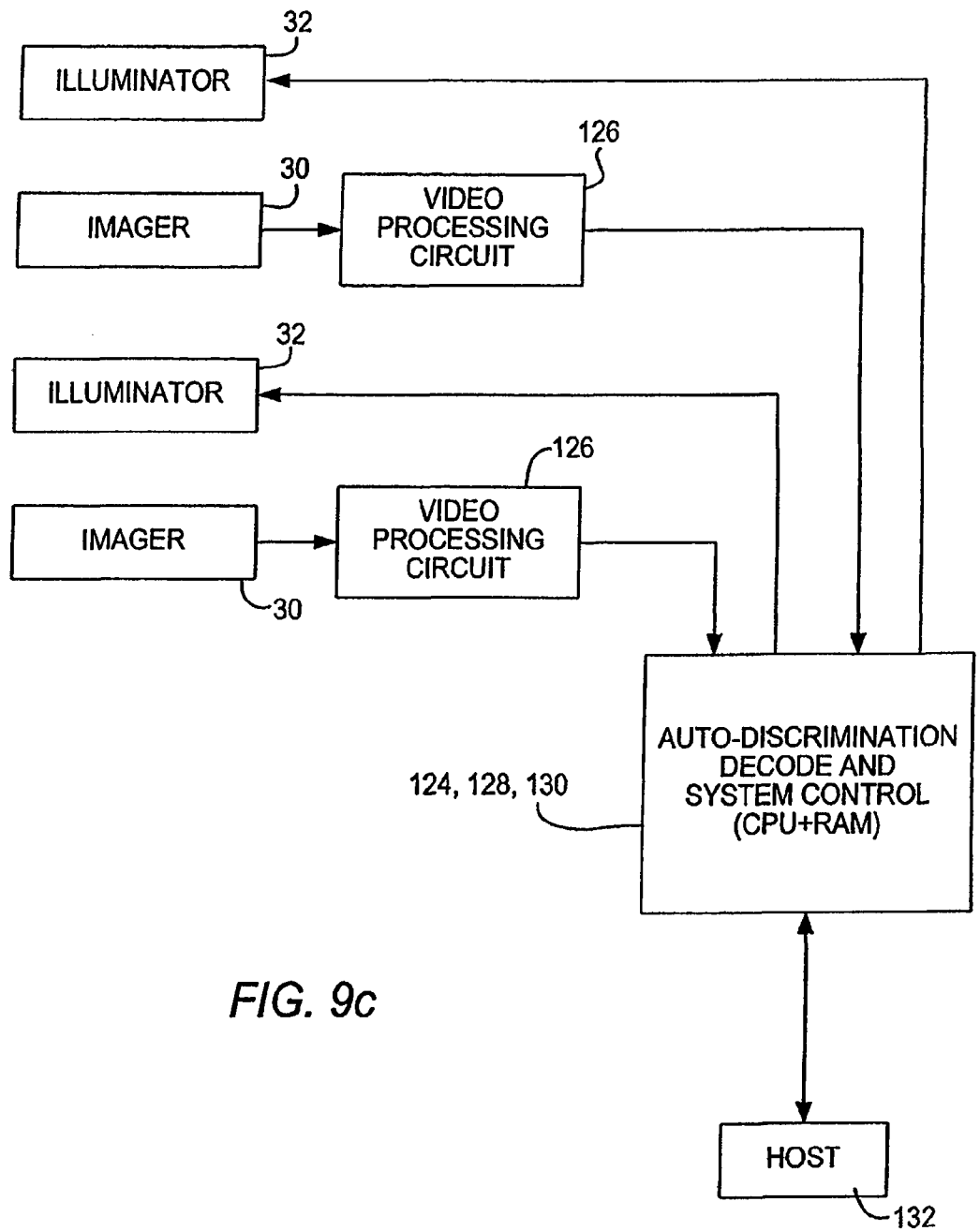

The configuration of FIG. 9a can still overload the single auto-discrimination system that must handle all the continuous video streams. This computational load can be further balanced if each video stream is allotted its own auto-discrimination and decode resources. Such a system, shown in FIG. 9b, scales better with faster video streams, larger images and higher frame rates. The resulting system controller requires only moderate CPU computational power as it receives only decoded (i.e., highly compressed) data from each video stream. The system controller is responsible for coordinating/arbitrating multiple decodes from different video streams and transmitting a final result to the host. This may include assembling partial decode results from different video streams. The local auto-discrimination circuits and decode CPUs are responsible for controlling the local imager and illuminator. In the event that computational power greatly improves, it is conceivable that all the auto-discrimination and decode functions can be consolidated into a single powerful system controller as shown in FIG. 9c.

In addition to transferring images of the symbols to the microprocessor 124, the video processing circuits 126 can also transfer the coordinates of the symbol and the class of symbol. The different video streams from the video processing circuits 126 are merged within the microprocessor 124 which is operative to forward the result of decoding to the host 132 if only one circuit 126 produces an output, or if two circuits 126 agree on a common decoding result, or if no two circuits 126 agree then one is chosen based on confidence levels, or if only partial decoding results from multiple circuits 126 can be combined to form a complete decoding result.

The split field of view need not be realized by field mirrors, but could also be effected by prisms or lenses. The field of view of a single imager can be split more than twice, and such multiple splitting is preferred to save costs related to providing additional imagers, illuminators and their associated optics.

Preferably, each imager has in excess of one million pixels. The pixels may have a square pitch. It preferred that the aspect ratio of the field-of-view is 9:5 for views through the horizontal window 12. It is also preferred if the split views are oriented at an angle of approximately 45° relative to the windows to allow coverage of symbols in either the ladder or picket fence orientations.

Each imager, or each viewing direction, is preferably provided with its own illuminator. Instead of LEDs, strobe light sources such as flash lamps could be used, or electronic shutters can be used for the imagers. Flashing the illuminator at too low a rate may be distracting and, as a result, it is best if the flashing is rapid enough to look like continuous illumination. Each illuminator should be synchronized with its imager. In addition, the illuminators and their corresponding imagers must all be synchronized to be out of phase with each other. This is to avoid any individual illuminator imager combination from interfering or blinding another imager with its flash. This coordination is accomplished by the system controller, either directly as in FIG. 9c, or indirectly as in FIG. 9b.

The imagers herein generate large amounts of data and, hence, the video processing circuits and the microprocessor will have to rapidly handle data in excess of one million bytes per second. As described in U.S. Pat. No. 6,237,053, a configurable operating system allows small, less powerful computers to run a wide variety of applications. Input is accepted from a number of input devices, and the operating system transfers the data to the appropriate application. A field programmable gate array (FPGA) is loaded with code to perform a translation based on an application at hand.

In accordance with another feature of this invention, large volumes of data can be processed by using a hardware/software system that uses a fast loading FPGA to implement each routine, that stores FPGA routine code in a memory, that loads FPGA programming code into the FPGA based on input data features found at different phases of a signal processing algorithm, and that moves input or intermediate data through a hardware processing unit by use of a central processing unit (CPU) or other data movement device. Hence, the novelty of this feature resides in the reprogramming of an FPGA, in real time, based on features observed during the signal processing. In addition, a data movement device is needed to move the data to be processed through a hardware subroutine.

Figure 10:
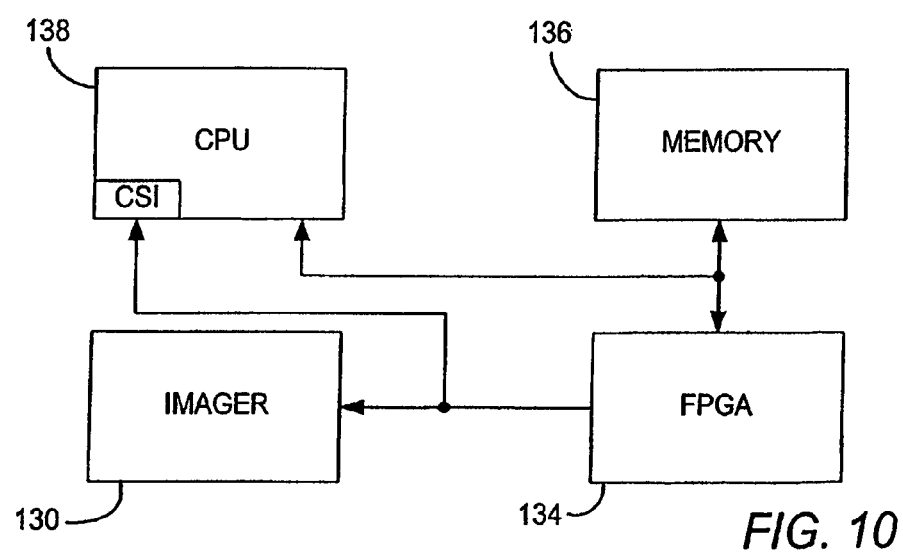
FIG. 10 is a block diagram of system architecture for data processing.

FIG. 10 shows an architecture to support this feature. The FPGA 134 is used to implement routines that would otherwise be time consuming. An example of such a routine is the computation of image statistics by the autodiscrimination circuit 128, as described in U.S. Pat. No. 6,250,551. The raw image is saved via a separate (CSI) port for later processing. FIG. 10 represents one possible implementation of the auto-discrimination and decode function shown in FIG. 9b. The FPGA code to implement this routine, and other possible signal processing functions, is actually stored in non-volatile memory 136 along with the rest of the software. On power-up, a default routine (in this case the statistics computation) is loaded into the FPGA.

When a trigger event initiates an image transfer from the imager 30 to the FPGA, the default statistics routine computes the desired image statistics (here the surface orientation of image blocks). Both the raw image and the computed statistics database is transferred in real time to the memory. The CPU 138 can then examine the statistics database to quickly infer if a desired target exists in the image. If such a target is found, a filter routine may be needed to suppress noise in the neighborhood of the target. Image filtering is also a computationally intensive task, and FPGA code that implements the filter can be transferred from memory to the FPGA. The raw image, or a part of it, can then be moved from memory through the FPGA and stored back into another location of memory. The resulting output image can then be used to extract features of the target. In a data acquisition environment, the target is a bar code symbol and the extracted features are the encoded information contained within the bar code symbol.

The practical value of this feature is in the efficient signal processing afforded by a hardware/software hybrid computation system. In addition, the hardware FPGA module can be reused for several routines and the code to accomplish this can be managed along with the regular software development systems. However, timing considerations in a hardware/software hybrid system is likely to be more critical than a software only system.

It will be understood that each of the elements described above, or two or more together, also may find a useful application in other types of constructions differing from the types described above.

While the invention has been illustrated and described as embodied in a point-of transaction workstation for electro-optically reading one-dimensional indicia and two-dimensional indicia by image capture, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An arrangement for processing a product bearing a target to be electro-optically read, comprising:
    a stationary workstation having a first window lying in a generally horizontal plane, and a second window lying in an upright plane that intersects the generally horizontal plane, the windows bounding a zone above the first window and in front of the second window, the zone containing the product on which the target is located during processing;
    a solid-state first imager having a first field of view and mounted behind the first window, and operative for capturing light passing in a first direction through the first window from the target in the zone;
    a solid-state second imager having a second field of view and mounted behind the second window, and operative for capturing light passing in a second direction through the second window from the target in the zone, the first and the second fields of view overlapping each other in the zone, and the first and the second directions intersecting each other in the zone, to capture the light from the target in a plurality of fields of view and in a plurality of directions;
    a first mirror mounted behind the first window;
    a second mirror mounted behind the first window, wherein the first mirror and the second mirror are configured to be generally facing each other;
    a solid-state third imager having a third field of view and mounted behind the first window, and operative for capturing light passing in a third direction through the first window from the target in the zone and being reflected by the first mirror;
    a solid-state fourth imager having a fourth field of view and mounted behind the first window, and operative for capturing light passing in a fourth direction through the first window from the target in the zone and being reflected by the second mirror; and
    wherein the third and the fourth fields of view overlapping each other in the zone, and the third and the fourth directions intersecting each other in the zone.

2. The arrangement of claim 1, wherein each imager includes one of a complementary metal oxide semiconductor (CMOS) array and a charge coupled device (CCD) array.

3. The arrangement of claim 1, wherein each imager includes an illuminator for illuminating the target in a time period less than 500 microseconds.

4. The arrangement of claim 1, wherein the target is one of a one-dimensional indicium and a two-dimensional indicium, and a processor operatively connected with each imager for processing and decoding the indicia.

5. The arrangement of claim 1, and a plurality of stationary field mirrors mounted at the workstation between the first window and the first imager.

6. The arrangement of claim 5, wherein the mirrors include a central mirror and side mirrors flanking the central mirror.

7. The arrangement of claim 1, and further comprising additional stationary field mirrors mounted behind the second window of the workstation.

8. A method of processing a product bearing a target to be electro-optically read, comprising the steps of:
    configuring a stationary workstation with a first window lying in a generally horizontal plane, and with a second window lying in an upright plane that intersects the generally horizontal plane, the windows bounding a zone above the first window and in front of the second window, the zone containing the product on which the target is located during processing;
    mounting a solid-state first imager having a first field of view behind the first window, and capturing light passing in a first direction through the first window from the target in the zone;
    a solid-state second imager having a second field of view behind the second window, and capturing light passing in a second direction through the second window from the target in the zone, the first and the second fields of view overlapping each other in the zone, and the first and the second directions intersecting each other in the zone, to capture the light from the target in a plurality of fields of view and in a plurality of directions; and
    mounting a first mirror behind the first window;
    mounting a second mirror behind the first window, wherein the first mirror and the second mirror are configured to be generally facing each other;
    mounting a solid-state third imager having a third field of view behind the first window, and capturing light passing in a third direction through the first window from the target in the zone and being reflected by the first mirror;
    mounting a solid-state fourth imager having a fourth field of view behind the first window, and capturing light passing in a fourth direction through the first window from the target in the zone and being reflected by the second mirror; and
    wherein the third and the fourth fields of view overlapping each other in the zone, and the third and the fourth directions intersecting each other in the zone.

9. The method of claim 8, and configuring each imager as one of a complementary metal oxide semiconductor (CMOS) array and a charge coupled device (CCD) array.

10. The method of claim 8, and illuminating the target in a time period less than 500 microseconds.

11. The method of claim 8, and configuring the target as one of a one-dimensional indicium and a two-dimensional indicium, and processing and decoding the indicia.

12. The method of claim 8, and mounting a plurality of stationary field mirrors at the workstation between the first window and the first imager.

13. The method of claim 12, and arranging the mirrors to include a central mirror and side mirrors flanking the central mirror.

14. The method of claim 8, and mounting additional stationary field mirrors behind the second window of the workstation.

* * * * *